March 29, 1966 R. A. DOVERSBERGER ET AL 3,242,770
TORQUE LIMITER FOR A MOTOR GRADER
Filed Dec. 18, 1962 5 Sheets-Sheet 1

INVENTORS:
RICHARD A. DOVERSBERGER
RAYMOND E. GILL
BY JOHN F. SCHMIDT

March 29, 1966  R. A. DOVERSBERGER ET AL  3,242,770
TORQUE LIMITER FOR A MOTOR GRADER
Filed Dec. 18, 1962  5 Sheets-Sheet 2

*INVENTORS:*
RICHARD A. DOVERSBERGER
RAYMOND E. GILL
BY
JOHN F. SCHMIDT

INVENTORS:
RICHARD A. DOVERSBERGER
RAYMOND E. GILL
BY
JOHN F. SCHMIDT

March 29, 1966  R. A. DOVERSBERGER ET AL  3,242,770
TORQUE LIMITER FOR A MOTOR GRADER
Filed Dec. 18, 1962  5 Sheets-Sheet 4

INVENTORS:
RICHARD A. DOVERSBERGER
RAYMOND E. GILL
BY
JOHN F. SCHMIDT

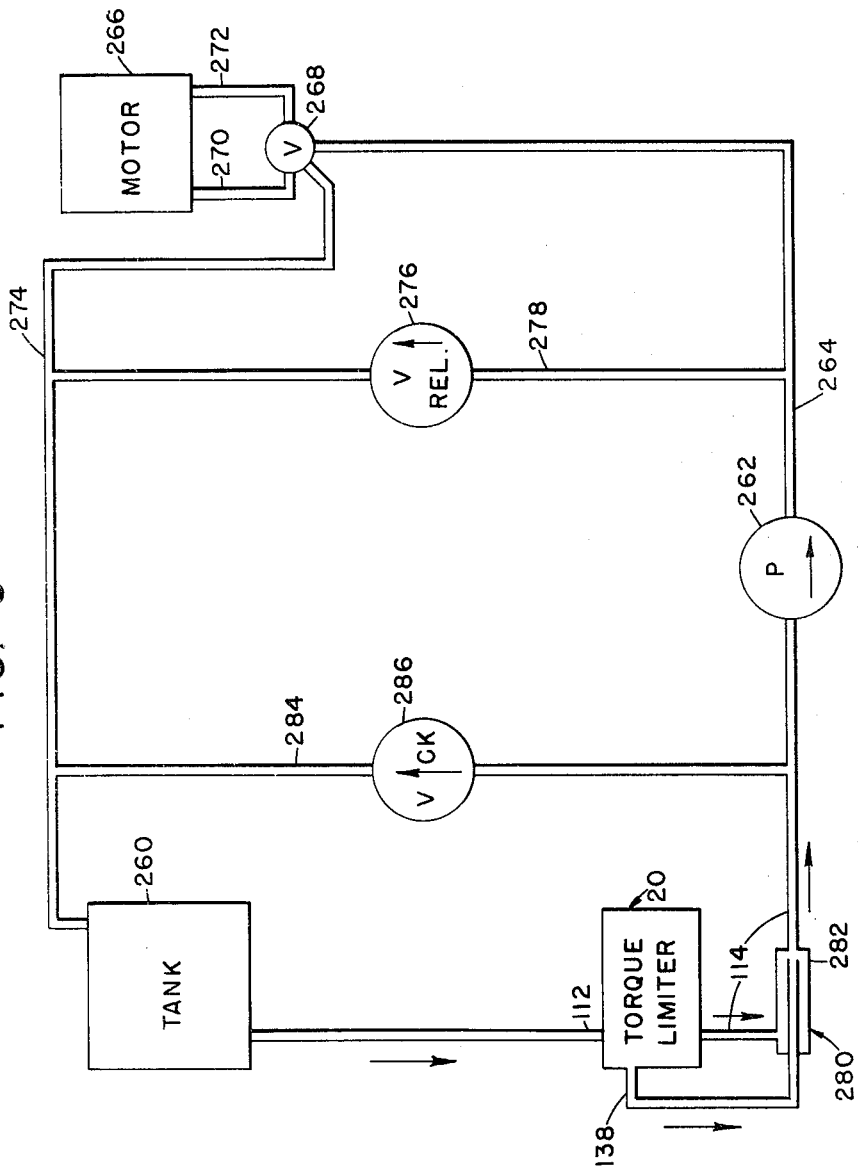

United States Patent Office 3,242,770
Patented Mar. 29, 1966

3,242,770
TORQUE LIMITER FOR A MOTOR GRADER
Richard A. Doversberger, Peoria, and Raymond E. Gill, Morton, Ill., assignors to Le Tourneau-Westinghouse Company, Peoria, Ill., a corporation of Illinois
Filed Dec. 18, 1962, Ser. No. 245,513
4 Claims. (Cl. 74—733)

This invention relates to motor graders, and is an improvement on the invention claimed in the sole patent application of Raymond E. Gill, Ser. No. 245,129, filed December 17, 1962, now abandoned, and assigned to the same assignee as this application.

Said sole application discloses but does not claim, as part of the combination, the features of a relief valve which operates at two different pressures in two steps or stages. Such a feature is desirable because the initial pressure available to open the valve drops to a much lower pressure as soon as the valve opens wide, and it is desirable that the valve remain wide open at the lower pressure until the power train is disengaged by the operator.

It is accordingly an object of this invention to provide a power train which will transmit a limited maximum of torque. The power train includes a valved passage in which a relief valve is opened at a high operating pressure and is held in a wide-open position by a much lower pressure until the operator disengages the drive.

FIG. 2 is an end elevation view of the exterior of the torque limiting device referred to;

FIG. 9 is a circuit diagram showing a typical hydraulic system for a motor grader and showing where the torque limiter fits into the hydraulic system.

DESCRIPTION

Figure 1:
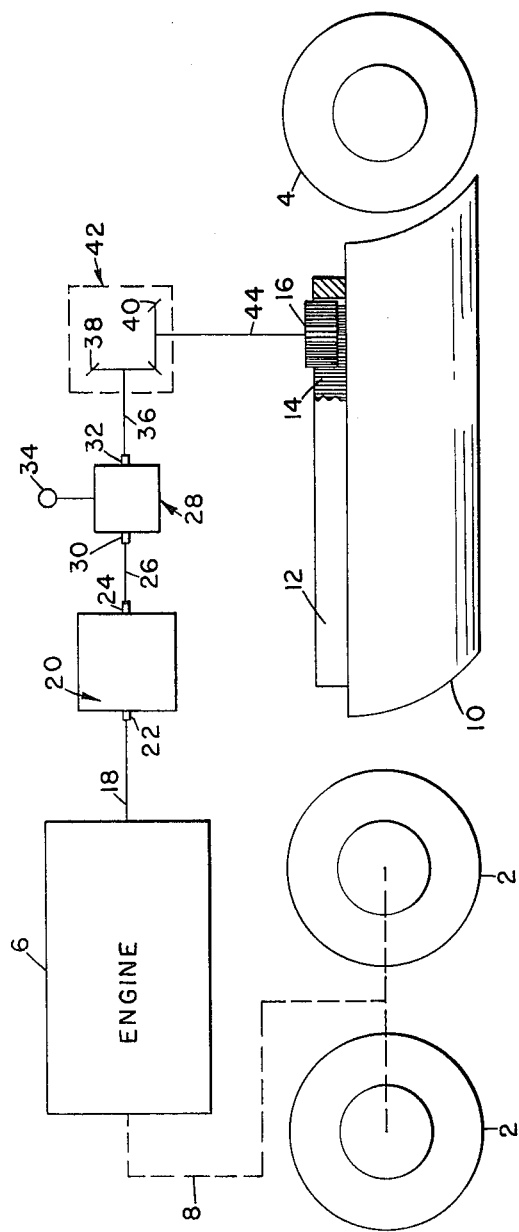
FIG. 1 is a schematic view of a motor grader here shown as provided with a blade, a circle, and means to rotate the circle.

A motor grader is shown schematically in FIG. 1 as having drive wheels 2 and front wheels, one of which is shown at 4. Any suitable source of power, such as an engine 6, is connected to the drive wheels 2 by any suitable conventional drive mechanism here indicated schematically as a dotted line 8.

The motor grader carries a grader blade 10 secured to a conventional grader circle 12. Circle 12 is rotatable on a supporting frame, not shown, and to this end, circle 12 bears internal teeth 14. A pinion 16 is located so that its teeth mesh with the teeth 14 of circle 12. Pinion 16 is connected to be driven by engine 6 through: a shaft 18; a torque limiter 20 having a torque-input connection 22 and a torque-output connection 24; a shaft 26; a power box 28 having a torque-input connection 30, a torque-output connection 32, and an operating handle 34; a shaft 36; bevel gears 38 and 40 of a bevel gear box 42; and a shaft 44.

It will of course be understood by those skilled in the art that the blade 10 here shown schematically is representative of a positionable element of a conventional motor grader. The other positionable elements are not shown here.

TORQUE LIMITING DEVICE

Figure 3:
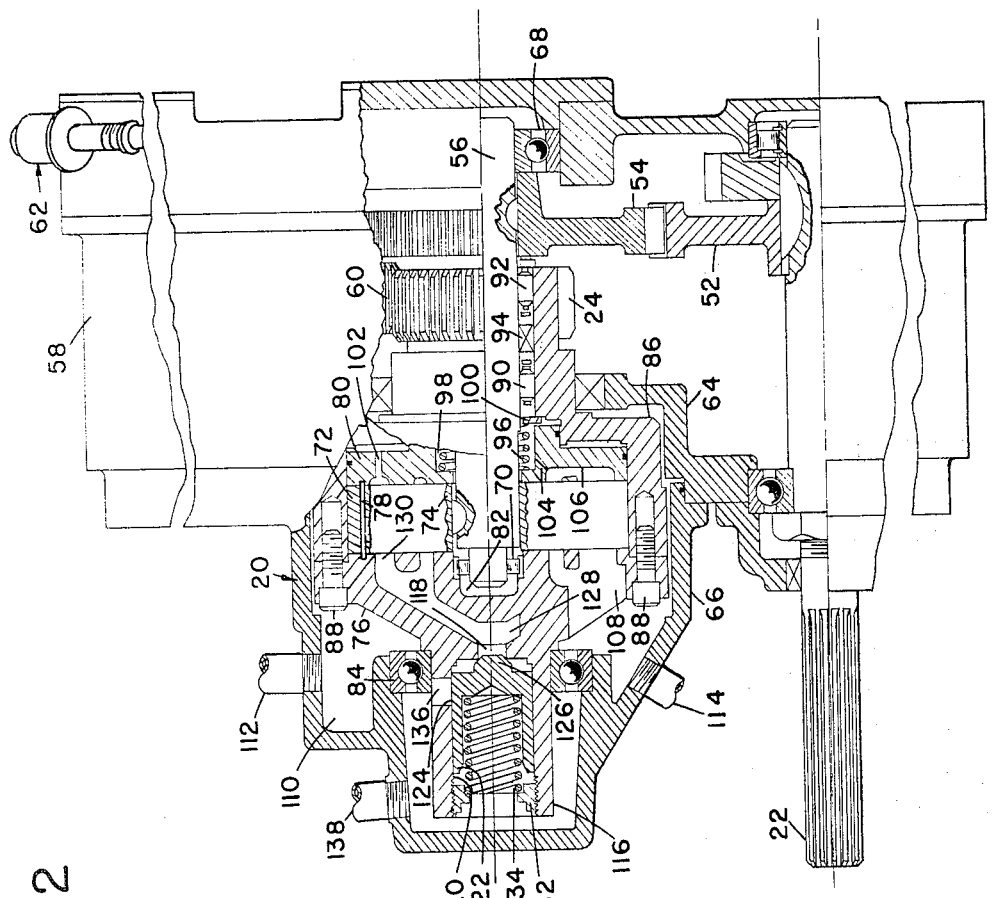
FIG. 3 is a view in section substantially on line 3—3 of FIG. 2, but on a much larger scale.
Figure 2:
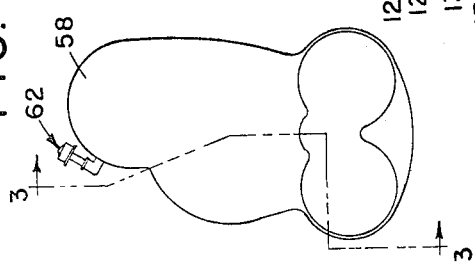

The torque limiting device (or torque limiter) indicated schematically at 20 in FIG. 1 is shown in detail in FIG. 3. The main purpose served by FIG. 2 is to show the planes on which the section is taken for FIG. 3. As here shown, a splined shaft is the torque-input connection 22, although the torque-input connection could be taken as gear 52 keyed to shaft 22, gear 54 meshing with and driven by gear 52, or shaft 56 to which gear 54 is keyed so as to be driven by gear 54. Similarly, the torque-output connection is any movable part to which a connection can be made to receive driving torque from the torque limiting device 20. As will be understood by those skilled in the art, such an output connection could be any one of a number of conventional devices, such as another splined shaft, a socket of some sort, a flexible coupling, or a gear. In the embodiment here shown, the output connection may be taken as a conventional spur gear 24.

In the embodiment of the invention here shown, the torque limiting device 20 is mounted in one end of a larger casing or housing 58 which also supports the power train forming the torque-input connection and referred to above as comprising elements 22, 52, 54 and 56. Torque-output connection 24 is part of a power train also mounted in housing 58 which includes still another spur gear 60 meshing with gear 24. These two power trains may be lubricated in any conventional manner. Housing 58 carries a breather connection indicated generally at 62. Suitable bearings and pressure as well as oil seals are provided in a conventional manner as needed; details of bearings and seals are not discussed here because they are conventional.

The torque limiting device 20 comprises a suitably shaped housing, here shown in two pieces, one of which is shown at 64 and forms one wall of housing 58, the other piece being shown at 66 and protruding from housing 58. Shaft 56 of the torque-input power train is mounted at its right end as shown in FIG. 3, for rotation relative to housing 58, in a suitable bearing 68. At its left end, shaft 56 is mounted for rotation by means of a bearing 70.

The torque limiter includes a positive displacement liquid pump having two elements movable relative to each other to draw liquid into the pump through an inlet port and to discharge liquid from the pump through a discharge port. One of the two relatively movable elements is driven by the torque-input connection, and the other relatively movable element drives the torque-output connection. The pump discharge port is connected with a valved passage in which a closure element is normally biased into a closed position to prevent liquid flow through the pump and thus to hold the two elements against relative movement whereby to effect the transmission of torque through the torque limiting device.

More specifically, a positive displacement liquid pump of the vane type having a rotor which turns relative to a cam ring to provide the pumping action is mounted in the housing parts 64 and 66. It will of course be understood by those skilled in the art that any of a number of positive displacement pumps can be used. This invention is currently being practised with a vane type pump purchased from the Denison Engineering Division of American Brake Shoe Company, Columbus, Ohio. The pump purchased from Denison is Denison's Catalog Number S114–07007, this being the cartridge from a TD-30 pump, and includes a rotor, 10 vanes, 30 springs (3 for each vane) and a cam ring. The cam ring is here shown at 72. A portion of the rotor is shown at 74. As will be understood by reference to a Denison catalog, the vanes, not shown here, are slidable in radial slots in the rotor and are biased radially outward against the inner surface of the cam ring by means of the springs referred to above. Cam ring 72 is held against rotation relative to a valved discharge passage 76 by means of a pin 78. Pin 78 also extends past the right face of cam ring 72 to provide means for locating a floating side plate 80. The aforesaid bearing 70 for the left end of shaft 56 is carried in a centrally located recess 82 in the valved passage 76.

Valved passage 76 is mounted for rotation in the portion 66 of the torque limiting device housing by means of a suitable bearing 84. The right face of valved passage 76, at its periphery, is secured to an output torque element 86 in any suitable manner, as for example by a plurality of threaded members 88. Output torque element 86 carries gear 24 which is referred to above as the torque-output connection of the torque limiting device. In the embodiment here shown, gear 24 is formed integral with the output torque element 86. Suitable bearings 90 and 92 rotatably support the output torque element 86 on the shaft 56. An oil seal 94 is preferably provided between bearings 90 and 92. A helical spring 96 is provided in a recess 98 in side plate 80. Spring 96 bears at its right end against a washer 100 and at its left end on the bottom of recess 98 and thus presses side plate 80 against the face of cam ring 72 to provide the initial pressure to keep plate 80 in engagement with the face of the cam ring. As will be understood by those skilled in the art, as soon as pressure builds up in the pump, the discharge pressure is applied to the right face of side plate 80 by means of a bleed port 102. To prevent a build-up of oil pressure in recess 98, a bleed port 104 is provided in the side plate 80 to connect recess 98 with a cavity 106 in the left face of side plate 80.

Cavity 106 is at intake pressure because it is connected with intake port 108 in valved passage 76. Valved passage 76 is rotatable in an annular space 110 in the external housing portion 66. Housing portion 66 is provided with two fluid conduit connections to receive fluid conduits 112 and 114 and oil under pressure from a conventional hydraulic system which may be provided as standard equipment on the motor grader. The hydraulic system is further described below.

At its left end as seen in FIG. 3, to the left of bearing 84, the valved passage 76 is provided with a number of valve elements which will now be described in detail. A valve seat-providing element consisting of a cup-shaped extension 116 (the "cup" is shown lying on its side in FIG. 3) is here shown as provided with a central opening 118 in the bottom of the "cup" and an internal bore 120. A valve closure element 122 is provided with a cylindrical surface 124 which engages internal bore 120 of valve seat-providing element 116, and with a conical boss 126. Boss 126 carries a conical surface which engages the left end of central bore 118 when closure element 122 is in the closed-passage position. Thus, the edge formed by the left end of passage 118 and the conical surface on boss 126 cooperate to form a pair of elements which provide engaging surfaces. (It may be noted that, theoretically, the conical surface engages the end of the hole in a line of contact having zero width. As a practical matter, the "line" always has a finite width and it is this finite, though very narrow, annulus at the end of hole 118 which provides one of the engaging surfaces of the pair referred to.) A second pair of elements consists of internal bore 120 and external surface 124 which cooperate to form engaging surfaces. Both pairs of engaging surfaces serve to close the valved passage in given positions of closure element 122.

In the position of the parts shown in FIG. 3, wherein closure element 122 is shown in the closed-passage position, a passage 128 in valved passage 76 communicates discharge port 130 with the central bore or opening 118, with the result that the projected area of boss 126 is exposed to pump discharge pressure when closure element 122 is in the closed-passage position. It will be apparent to those skilled in the art that, under these circumstances, no other areas of closure element 122 are exposed to pump discharge pressure. It will be further evident to those skilled in the art that, as soon as closure element 122 has moved leftward enough to separate the engaging surfaces of boss 126 and the end of bore 118, the entire projected area of the right end of closure element 122 will be exposed to pump discharge pressure. It will be apparent that this last-named area includes the first-named projected area and is in fact a multiple of the first-named projected area. In the embodiment here shown, the second-named area is approximately nine times the first-named area.

The left end of internal bore 120 is threaded to receive a threaded spring seat 132. A spring 134 is mounted in a recess of closure element 122; spring 134 bears at its left end against the spring seat 132 and at its right end against closure element 122.

Cup-shaped extension 116 is provided near its right end with a port 136. The left end of housing portion 66 is provided with a fluid conduit connection to receive a fluid conduit 138.

OPERATOR CONTROLLED POWER BOX

Referring momentarily to FIG. 1 again, it will be seen that torque-output connection 24 drives a shaft 26 which in turn drives a torque-input connection 30 of the power box 28. Power box 28 will now be described in detail by referring to FIGS. 4–7.

Figure 6:
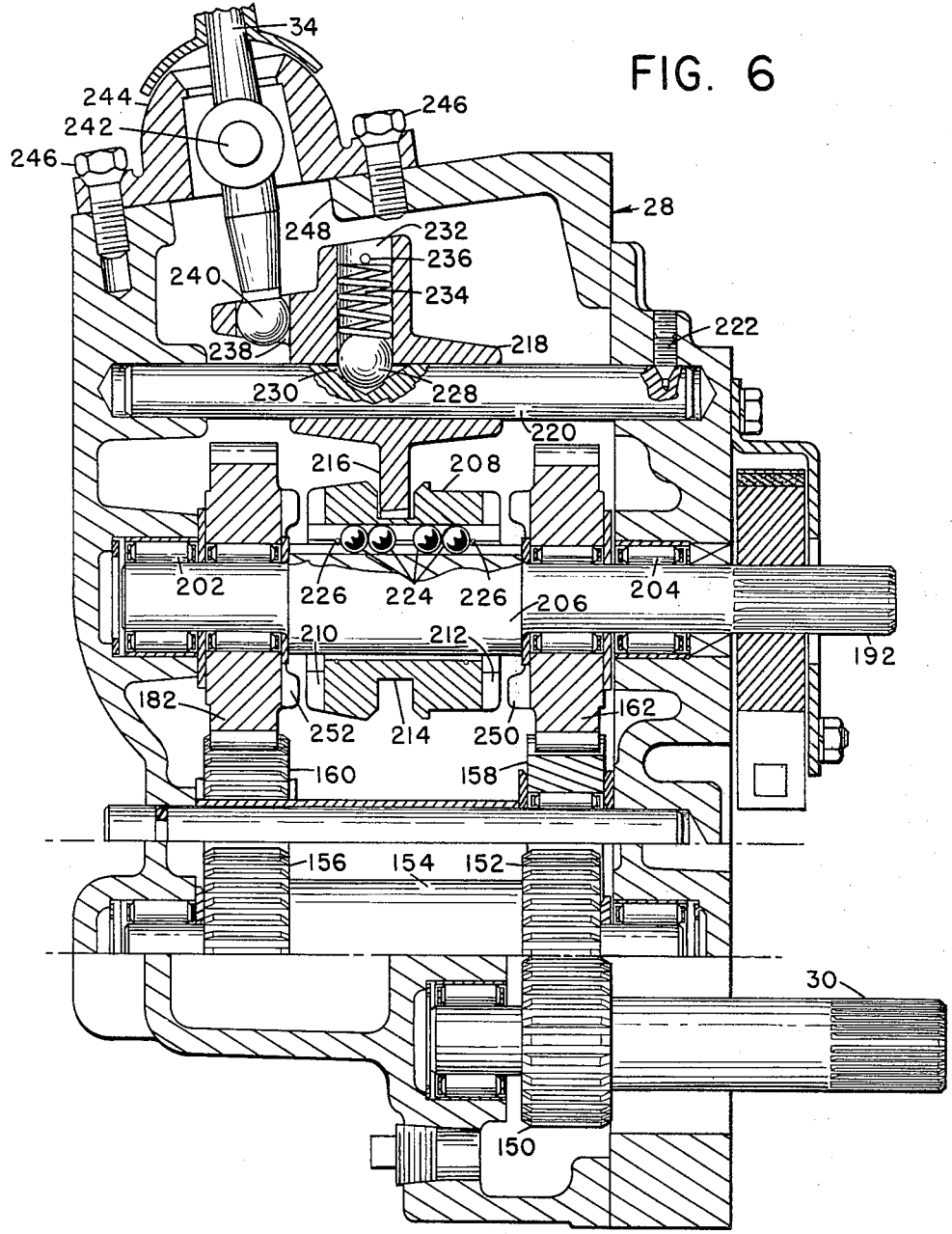
FIG. 6 is a view in section through the power box shown substantially on line 6—6 of FIG. 4, but on a larger scale.

In FIG. 6, torque-input connection 30 is shown as a shaft carrying an input gear 150. Gear 150 meshes with a gear 152 which may be mounted on or integral with a countershaft 154. Countershaft 154 also carries a gear 156. Gears 152 and 156 rotate as one member through the medium of countershaft 154. Gear 152 meshes with a gear 158, and gear 156 meshes with a gear 160. Gear 158 meshes with a gear 162 which is one of a six-gear train. Gear 160 meshes with a gear 164 which is one of a second six-gear train.

The two six-gear trains referred to above are mounted in pairs on substantially parallel shafts. Thus, in the first-named six-gear train, gears 166, 168, 170, 162, 172, and 174 are in mesh in series so that alternate gears rotate in the same direction. In the second six-gear train, gears 176, 178, 180, 182, 164, and 184 are arranged in mesh in series, and again, the arrangement is such that alternate gears rotate in the same direction. Regarding the pairing of the gears, gears 166 and 176 are freely rotatable on a common shaft indicated schematically at 186. Gears 168 and 178 rotate freely on a common shaft shown schematically at 188. Gears 170 and 180 rotate freely on a common shaft shown schematically at 190. Gears 162 and 182 rotate freely on a common shaft shown schematically at 192. Gears 172 and 164 rotate freely on a common shaft shown schematically at 194, and gears 174 and 184 rotate freely on a common shaft 196.

Gears 158 and 160 turn in the same direction, but because gear 160 meshes with the second gear from the right in the second six-gear train while gear 158 meshes with the third gear from the right of the first six-gear train, the two gears of each pair of gears rotatable on a common shaft will be found to rotate in opposite directions, thus: gears 166 and 176 rotate freely, in opposite directions, on their common shaft 186; gears 168 and 178 rotate freely in opposite directions on their common shaft 188; gears 170 and 180 rotate freely in opposite directions on their common shaft 190; gears 162 and 182 rotate freely in opposite directions on their common shaft 192; gears 172 and 164 rotate freely in opposite directions on their common shaft 194; and gears 174 and 184 rotate freely in opposite directions on their common shaft 196.

Figure 5:
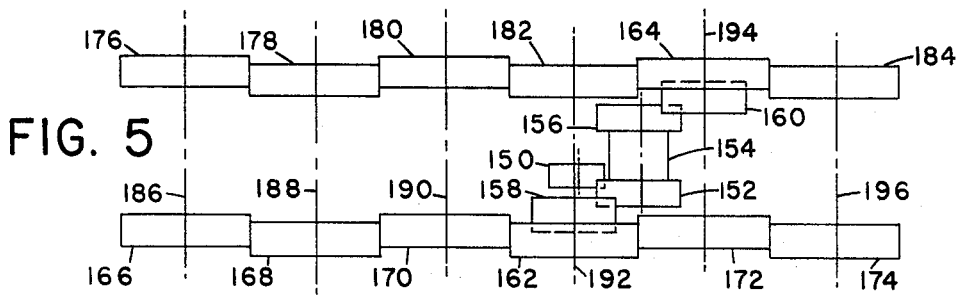
FIG. 5 is a top plan view of the power train shown schematically in FIG. 4.
Figure 4:
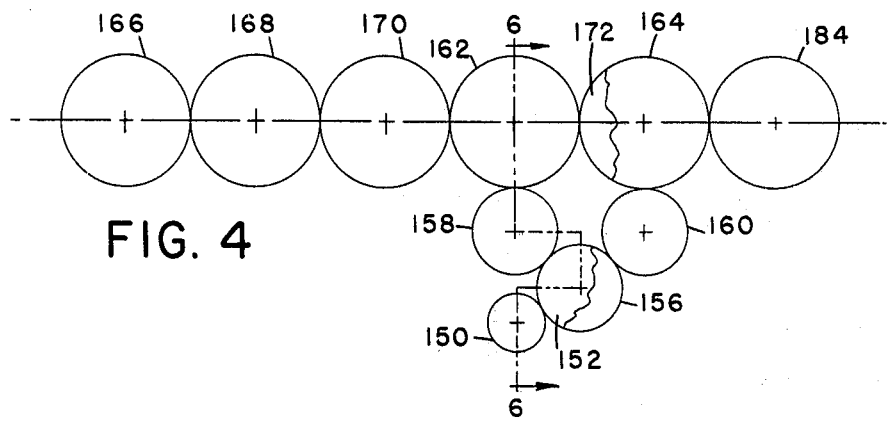
FIG. 4 is a schematic view of the power train constituting the gears of the power box by which the operator controls the position of each positionable element.

It will be understood by those skilled in the art that each of the shafts indicated schematically in FIG. 5 at 186, 188, 190, 192, 194, and 196 constitutes a torque-output connection for the particular positionable element for that power train. This torque-output connection is indicated at 32 in FIG. 1. The corresponding element shown in FIG. 6 is the shaft 192. Because the shafts 186–196 listed above are substantially alike, it will suffice to described one of them.

As is best seen in FIG. 6, shaft 192 is rotatable in the power box housing by means of bearings 202 and 204. Between its ends, shaft 192 is enlarged as shown at 206. The larger portion 206 is suitably splined or keyed so as to be non-rotatable relative to a shiftable element 208 carrying dog clutches 210 and 212. The protruding end of shaft 192 may be keyed or splined in order to drivingly connect with a shaft such as the shaft 36 shown schematically in FIG. 1.

Between its ends, shiftable element 208 is grooved as shown at 214 to receive a shifter fork 216. Shifter fork 216 is carried by a direction selector element 218 which is mounted to be axially shiftable on a shaft 220. Shaft 220 is secured in the housing of the power box 28 by means of suitable bores in the housing and end cover and a set screw 222.

As aforementioned, shiftable element 208 is axially movable on large diameter 206 and is keyed thereto by one or more keys engaging suitable axial grooves in shiftable element 208 and large diameter 206. Serving as keys, balls 224 engage the cooperating slots (or keyways) to make lateral shifting of shiftable element 208 possible with a minimum of frictional resistance. The balls 224 may be held in place by suitable snap rings 226.

A ball detent 228 is provided in direction selector element 218. For the neutral position of element 218, ball 228 is biased into a recess 230 in shaft 220. To this end, ball 228 is movable in a bore 232 against the bias of a spring 234 working against a spring stop 236. Direction selector element 218 is recessed at 238 to receive the engaging end 240 of operating handle 34. Handle 34 is pivotally mounted at 242 in a hinge-providing member 244. Member 244 is secured by threaded members 246 to the upper end of the housing of power box 28, with the end 240 extending through an opening 248 in the upper wall of the power box housing.

Each of the pairs of oppositely rotating gears 166–176, 168–178, 170–180, 162–182, 172–164, and 174–184 is provided at its inner face with a dog clutch engageable with a dog clutch on the shiftable element referred to above. Thus, in the portion of the power train illustrated in FIG. 6, a dog clutch 250 on the inner face of gear 162 is adapted to engage the dog clutch 212. Similarly, gear 182 is provided at its inner face with a dog clutch 252 adapted to engage the dog clutch 210.

Figures 7, 8:
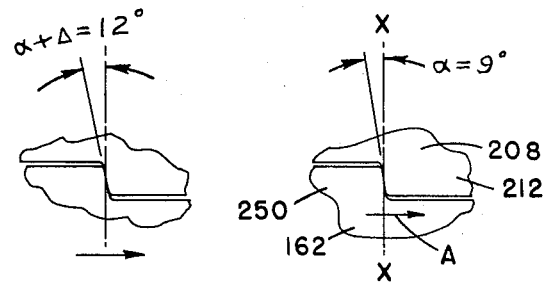
FIG. 7 is a view of a portion of one set of dog clutch jaws shown in the engaged position and showing the angle that the engaging faces make with a plane passing through the axis of rotation.
FIG. 8 is a view similar to the one shown in FIG. 7 but illustrating the somewhat larger angle of the prior art.

Reference will now be had to FIG. 7 for a better understanding of the design of the dog clutches referred to above. FIG. 7 shows portions of dog clutches 250 and 212 in engagement. The clutches are rotatable about an axis of rotation X—X in the direction indicated by arrow A, with the dog clutch 250 driving the dog clutch 212. The faces of the dogs engage at an angle $\alpha$ with a plane through the axis X—X. The angle $\alpha$ is any suitable angler greater than zero and is here provided in order to bias the shiftable element 208 into a neutral position in which neither of its dog clutches 210, 212 engages the cooperating dog clutch of gear 252 or 250. It will be understood by those skilled in the art that the driving force transmitted by dog clutch 250 to dog clutch 212 will have an axial component due to the angle $\alpha$ and it is that axial component of the driving force which biases the shiftable element 208 into neutral as soon as the operator releases his hold on handle 34.

A prior art dog clutch arrangement is shown in FIG. 8, wherein the angle $\alpha$ plus $\Delta$ is seen to be greater by the amount $\Delta$ than the angle $\alpha$ shown in FIG. 7. The explanation for this difference helps to explain the reason for this invention. In prior art motor graders, there was no torque limiting device such as that shown at 20 in FIG. 1. Accordingly, the angle of engagement had to be large enough to force shiftable element 208 into neutral against the hand of the operator when the positionable element of the grader could no longer be moved due to some obstacle such as a rock, a masonry wall, or the like. To make the disengagement of the power box more certain and thus to lessen the likelihood of damage to the power train or the positionable element, the angle of engagement had to be large enough to give the operating handle 34 a substantial "kick." That kick sometimes resulted in broken fingers for the operator.

In a motor grader provided with the torque limiter of this invention, the power train is interrupted by the torque limiter as will be explained below, so that the angle $\alpha$ in FIG. 7 need be only enough to restore shiftable element 208 to neutral after the operator has relinquished his grasp of handle 34. Angle of $\alpha=9°$ has been found adequate, as opposed to $12°$ for $\alpha+\Delta$.

HYDRAULIC CIRCUIT

Reference will now be made to FIG. 9 for an explanation of the hydraulic circuit. As there shown, the hydraulic circuit comprises a supply tank or reservoir 260 mounted above torque limiter 20 sufficiently to provide a static head at the torque limiter. How much of a head is required depends on other designed details, such as the sizes of ports, rate of flow, and the like. Tank 260 is connected with the torque limiter annular space 110 by means of conduit 112. This connection brings oil into the torque limiter housing at its upper extremity as seen in FIG. 3. As long as the torque limiter is "locked up," there will be no flow of oil out of the torque limiter by way of conduit 138. Instead, oil will leave the torque limiter annular space 110 by way of conduit 114. The static head which is present because of the location of tank 260 relative to torque limiter 20 should be enough to assure that the annular space 110 is always completely full of liquid (no entrained gas). Conduit 138 connects the left end of the torque limiter as seen in FIG. 3 with conduit 114.

Conduit 114 connects with the suction side of a hydraulic pump 262. The discharge of pump 262 is connected with a conduit 264 which delivers oil under pressure to one or more accessories (here labelled "MOTOR") by way of a control valve 268. Control valve 268 has two ports which connect with accessories 266 by way of conduits 270 and 272. Conduits 270 and 272 alternately serve as supply and return lines for oil moving between valve 268 and accessories 266. Low pressure oil returned from accessories 266 goes back to tank 260 by way of a conduit 274. Conduits 264 and 274 are connected by means of a controllable relief valve 276 in a connecting conduit 278.

The connection referred to above of conduit 138 into conduit 114, may be made by any conventional means; a preferred arrangement, shown schematically in FIG. 9, incorporates a device indicated generally at 280 which may comprise simply a large diameter piece of conduit 282 in the conduit 114, with conduit 138 extending into the enlargement 282 so as to produce a nozzle effect in the large conduit 282. The purpose of the device 280 is to remove gas bubbles which may have been entrained by the liquid going to torque limiter 20 by way of conduit 112.

The capacity of the vane pump in torque limiter 20 is substantially greater than the capacity of pump 262. It is accordingly desirable to bypass pump 262 by means of a conduit 284 in which there is arranged a check valve 286. Conduit 284 connects conduit 114 with conduit 274, and check valve 286 is arranged to permit oil to flow only from conduit 114 to conduit 274.

It may be noted here that not all motor graders are equipped with hydraulic systems to operate accessories (such as power steering). In that case, the hydraulic system including the torque limiter could be just the portion involving conduit 284 and everything shown to the left of conduit 284 in FIG. 9.

OPERATION

Let it be assumed that a motor grader provided with a power train for the control of positionable elements made according to this invention is equipped as shown in FIG. 1 to drive the circle 12 to which blade 10 is secured. If now the operator moves handle 34 toward him to turn the circle in one direction, the lower end 240 of handle 34 moves direction selector element 218 to the right as seen in FIG. 6. This movement causes ball 228 to roll out of the recess 230 against the bias of spring 234 and brings dog clutches 250 and 212 into engagement. Circle gear 14 is thereupon turned by power flow as follows: (starting with FIG. 1) engine 6 drives the shaft 18 which drives torque-input connection 22. Connection 22 is a shaft (FIG. 3) which carries and drives gear 52. Gear 52 meshes with and drives gear 54 which is keyed to shaft 56 so that shaft 56 is also driven.

At its left end, shaft 56 carries and is keyed to rotor 74. The resistance to movement of circle 12 has the effect of attempting to hold cam ring 72 against rotation, with the result that rotor 74 attempts to turn inside cam ring 72. The only way such relative rotation can take place is for these elements to act as a pump, taking oil in at 108 under low pressure and discharging oil at 130 at high pressure. Oil discharged under high pressure from discharge port 130 enters the valved passage 76. More specifically, the passage 128 is filled with oil under pressure. Oil cannot flow through passage 128 freely because valve closure element 122 is in the position shown in FIG. 3, wherein conical boss 126 is tightly in engagement with the seat provided by the left end of central opening 118, under the influence of spring 134. With oil flow through central opening 118 blocked, rotor 74 is not able to rotate relative to cam ring 72 because cam ring 72 also rotates. Thus, the two elements 72 and 74 are "locked up" and rotate as a unit (except for leakage losses). Cam ring 72 is pinned at 78 to the valved passage 76, which in turn is bolted to output torque element 86. Output torque element 86 carries gear 24 (as here shown, gear 24 is formed integral with element 86). Gear 24 is the torque-output connection shown schematically at 24 in FIG. 1.

Torque-output connection 24 drives shaft 26, which in turn drives torque-input connection 30 of power box 28. As is now best seen in FIGS. 4–6, torque-input connection 30 drives gear 150. Gear 150 meshes with and drives gear 152, which in turn drives gear 158. Gear 158 meshes with and drives gear 162.

Gear 162 is freely rotatable on shaft 192 (FIG. 6). Dog clutch 250 is in driving engagement with dog clutch 212 as aforesaid, so that gear 162 drives shiftable element 208 which is keyed to shaft 192 as aforesaid and rotates shaft 192.

Shaft 192 is the torque-output connection shown in FIG. 1 at 32. Torque-output connection 32 rotates shaft 36 which rotates bevel gear 38 in gear box 42. Bevel gear 40 is driven by bevel gear 38 and in turn drives pinion 16 by means of shaft 44. As pinion 16 turns, it meshes with and drives the circle gear 14, rotating the blade 10 in the direction selected by the operator when he moved operating lever 34.

Now let it be assumed that, as the blade 10 turns, one end comes against a masonry wall with the result that it is physically impossible to turn blade 10 any farther. Gear 24 (FIG. 3) is then held stationary, and with it output torque element 86, valved passage 76, and cam ring 72. Rotor 74 thereupon rotates relative to cam ring 72 and pressure in the passage 128 builds up to the point where the total force exerted on the exposed projected area of conical boss 126 suffices to overcome the bias of spring 134 enough to "crack" the seal between conical boss 126 and the left end of central opening 118. The pressure in passage 128 is thereupon applied to the entire projected area of the right end of closure element 122. This new projected area is so much greater (as here shown, about 9 times greater) than the exposed projected area of boss 126 that the force on closure element 122 immediately increases greatly. Closure element 122 is thereupon snapped sharply to the left against spring seat 132, and oil flows through passage 128, central opening 118 and port 136 to conduit 138.

At this point in the operation, the discharge pressure at port 130 drops considerably, but closure element 122 is still held wide open because of the much larger effective area now exposed to pump discharge pressure. The power train recited above through the torque limiter 20 is now broken. As soon as the operator realizes that the power train has been broken by the action of the torque limiter, he relinquishes his grasp of handle 34. With handle 34 no longer held in the operating position described above, the axial component of force at the face of engagement of dog clutches 212 and 250 (FIG. 7) forces the shiftable element 208 to the left into the neutral position shown in FIG. 6. In this position, there is no longer any driving torque applied to rotor 74 (FIG. 3), with the result that the pressure at discharge port 130 becomes substantially equal to the pressure at the pump intake. Spring 134 thereupon snaps closure element 122 back into the closed-passage position shown in FIG. 3. The torque limiter is then ready once more to transmit torque from the engine to the appropriate control device of a positionable element as selected by the operator.

The operation of the hydraulic circuit shown in FIG. 9 will be apparent to those skilled in the art from the above description of the circuit and need not be detailed here.

It will further be apparent to those skilled in the art that this invention provides an improved torque limiting device in the power train of a motor grader which will assure interruption of the power train rather than destruction of an expensive machine part of the motor grader. Other advantages will also be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. In a motor grader having a positionable element, means to change the position of the element, a source of power, and means connecting the position changing means with the power source, the last-named means comprising:
   (a) controllable means having a torque-input connection and a torque-output connection and operator-operable to couple the input and output connections; and
   (b) a torque limiting device comprising
      (1) a positive displacement liquid pump having two relatively movable elements,
      (2) a passage to receive liquid under pressure as displaced by relative movement of said elements, and
      (3) valve means in said passage to prevent liquid flow until the pressure in said passage reaches a predetermined maximum and having a closed position and an open position, the valve means having in its closed position an effective area exposed to pressure in said passage and in its open position a larger effective area exposed to pressure in said passage.

2. In a motor grader having a positionable element, means to change the position of the element, a source of power, and means connecting the position changing means with the power source and comprising:
(a) controllable means having a torque-input connection and a torque-output connection and operator-operable to couple the input and output connections; and
(b) a torque limiting device comprising
 (1) a positive displacement liquid pump having a passage to receive liquid under pressure,
 (2) a valve seat-providing element in the passage,
 (3) a pressure-responsive closure element movable in the passage between a closed-passage position and a wide-open-passage position,
 (4) a pair of elements cooperating to provide engaging surfaces on the seat-providing element and the closure element for the closed-passage position of the closure element, said pair of elements also cooperating to provide a first surface of a given area exposed to liquid under pressure with the closure in closed-passage position, and
 (5) a second pair of elements cooperating to provide other engaging surfaces on the seat-providing element and the closure element and cooperating also to expose an area larger than the given area to liquid under pressure for all positions of the closure element other than closed-passage position, whereby the pressure-responsive closure element responds in its closed-passage position to a given liquid pressure and in all other positions to a lower liquid pressure.

3. In a motor grader having a positionable element, means to change the position of the element, a source of power, and means connecting the position changing means with the power source and comprising:
(a) controllable means having a torque-input connection and a torque-output connection and operator-operable to couple the input and output connections; and
(b) a torque limiting device comprising
 (1) a positive displacement liquid pump having a passage to receive liquid under pressure,
 (2) a valve seat-providing element in the passage,
 (3) a pressure-responsive closure element movable in the passage between a closed-passage position and a wide-open-passage position,
 (4) a pair of elements cooperating to provide engagin surfaces on the seat-providing element and the closure element for the closed-passage position of the closure element, said pair of elements also cooperating to provide a first surface of a given area exposed to liquid under pressure with the closure element in closed-passage position, and
 (5) a second pair of elements cooperating to provide other engaging surfaces on the seat-providing element and the closure element and cooperating also to expose an additional area larger than the given area to liquid under pressure for all positions of the closure other than closed-passage position, whereby the pressure-responsive closure element responds in its closed-passage position to a force which is the result of a given liquid pressure applied to said first surface and in all other positions to a force which is the result of a liquid pressure substantially less than said given pressure applied to a surface consisting of the given area and said additional area.

4. In a motor grader having a positionable element, means to change the position of the element, a source of power, and means connecting the position changing means with the power source and comprising:
(a) controllable means comprising
 (1) a torque-input connection,
 (2) a torque-output connection,
 (3) operator-operable means to couple the input and output connections having a neutral position in which the input and output connections are uncoupled and another position in which the input and output connections are coupled, and
 (4) means biasing the operator-operable means into said neutral position; and
(b) a torque limiting device comprising
 (1) a positive displacement liquid pump having a passage to receive liquid under pressure,
 (2) a valve seat-providing element in the passage,
 (3) a pressure-responsive closure element movable in the passage between a closed-passage position and a wide-open-passage position,
 (4) a pair of elements cooperating to provide engaging surfaces on the seat-providing element and the closure element for the closed-passage position of the closure element, said pair of elements also cooperating to provide a first surface of a given area exposed to liquid under pressure with the closure element in closed-passage position, and
 (5) a second pair of elements cooperating to provide other engaging surfaces on the seat-providing element and the closure element and cooperating also to expose an area larger than the given area to liquid under pressure for all positions of the closure element other than closed-passage position, whereby the pressure-responsive closure element responds in its closed-passage position to a given liquid pressure and in all other positions to a lower liquid pressure.

References Cited by the Examiner
UNITED STATES PATENTS

| | | | |
|---|---|---|---|
| 2,213,836 | 9/1940 | Gaddoni. | |
| 2,307,676 | 1/1943 | Harlan | 74—733 |
| 2,738,046 | 3/1956 | Kostenko | 192—60 |
| 2,787,356 | 4/1957 | Dionigi | 192—60 |

DAVID J. WILLIAMOWSKY, *Primary Examiner.*

DON A. WAITE, *Examiner.*

H. S. LAYTON, *Assistant Examiner.*